Nov. 3, 1970 — T. RADECKI — 3,537,648

INSECT BARRIER FOR IRRIGATION NOZZLES

Filed Nov. 26, 1968

INVENTOR.
TONY RADECKI
BY Lyon & Lyon
ATTORNEYS

United States Patent Office 3,537,648
Patented Nov. 3, 1970

3,537,648
INSECT BARRIER FOR IRRIGATION NOZZLES
Tony Radecki, West Covina, Calif., assignor to Rain Bird Sprinkler Mfg. Corp., Glendora, Calif., a corporation of California
Filed Nov. 26, 1968, Ser. No. 779,039
Int. Cl. B05b 15/02
U.S. Cl. 239—288.3                        2 Claims

ABSTRACT OF THE DISCLOSURE

A barrier which is attached to the removable nozzle of an irrigation sprinkler and is centered within the sprinkler outlet passage by means of radial fins, the barrier having a tapered and pointed outer end which blocks entrance of insects, such as wasps, without adversely affecting the flow of water from the sprinkler nozzle.

BACKGROUND OF THE INVENTION

In some areas where irrigation sprinklers are used, the sprinklers become plugged due to the habit of certain insects, usually wasps, to build nests of mud in the sprinkler nozzles, particularly the larger ones. Several attempts have been made to prevent this. One has been to provide a hinged flap which covers the nozzle when the sprinkler is not in use. Another approach has been to provide an internal reciprocable closure which is retracted to open the nozzle when water is applied. Both require moving parts which can fail to function or interfere with the stream of water discharged from the sprinkler, and at least the internal reciprocable closure, is expensive.

The problem is mainly confined to the larger sprinkler nozzle having relatively long range; that is, nozzles having openings in the order of $1/16$ to $1/8$ inch are not involved.

SUMMARY OF THE INVENTION

The present invention is directed to a simple and inexpensive solution to the problem of clogged irrigation sprinklers due to the activity of insects and included in the objects of the invention are:

First, to provide an insect barrier which is attached to a removable sprinkler nozzle for insertion and removal therewith, the barrier being in the form of a pointed element centered in the nozzle orifice.

Second, to provide an insect barrier which does not interfere with water flow through the nozzle, but in fact, minimizes turbulence and thus improves the flow of water.

Third, to provide a combined nozzle and insect barrier wherein the pointed end of the barrier protrudes beyond the nozzle opening and is guarded by the ends of radial ribs which also may be manually engaged to insert and remove the nozzle and barrier.

Figure 1:
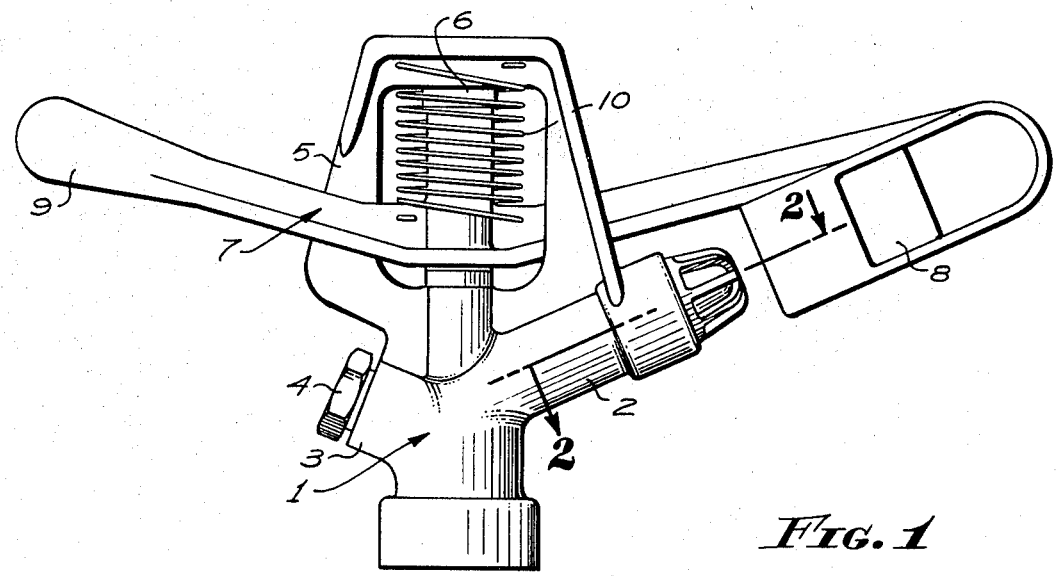
FIG. 1 is a side view of a sprinkler head, showing the insect barrier installed therein.
Figure 2:
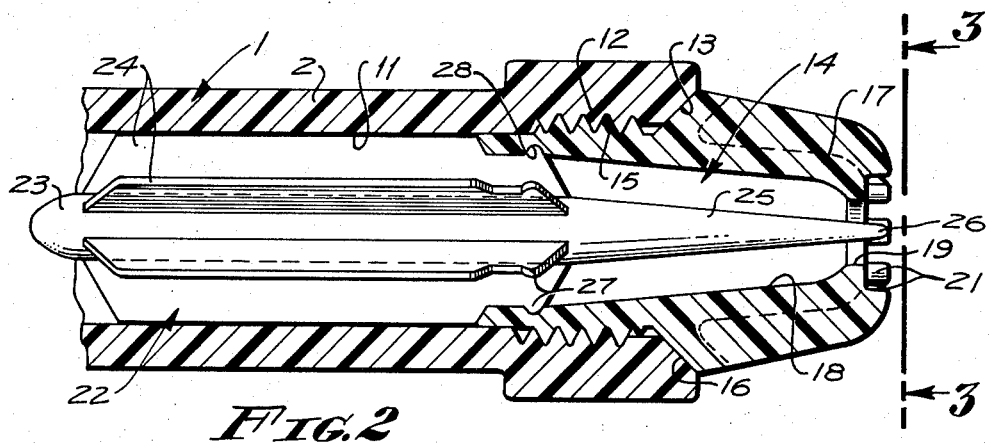
FIG. 2 is an enlarged fragmentary sectional view, taken through 2—2 of FIG. 1, showing the barrier member in plan.
Figure 4:
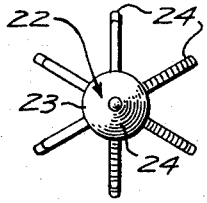
FIG. 4 is an end view of the barrier member.
Figure 3:
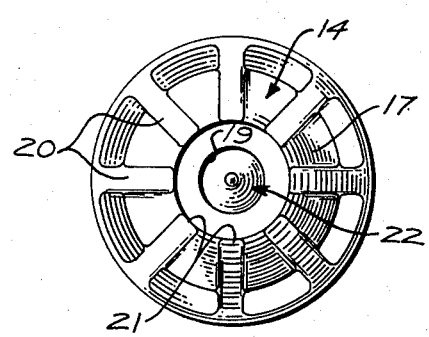
FIG. 3 is an end view thereof, taken from 3—3 of FIG. 2.

A typical irrigation sprinkler in which the insect barrier may be incorporated includes a sprinkler body 1, intended to be mounted on a riser, not shown, and having an upwardly and laterally directd main nozzle stem 2, and an upwardly and laterally directed secondary nozzle stem 3. In many cases, the secondary nozzle stem is omitted, but if provided, is equipped with a secondary nozzle 4, having a relatively small orifice, that is, an orifice too small to permit entrance of an insect of the type which would seal off the nozzle.

A frame 5 extends upwardly from the sprinkler body and is provided with a central post, not shown, which receives the hub 6 of an oscillating unit 7. One end of the oscillating unit terminates in a spoon 8, which hangs in front of the main nozzle stem 2. The other end of the oscillating unit forms a counterbalance arm 9. The oscillating unit is biased by a spring 10.

The sprinkler rotates intermittently by reason of the fact that a jet of water issuing from the main nozzle stem causes the spoon 8 to oscillate and in doing so repeatedly impacts the frame 5 to turn the nozzle body.

The main nozzle stem is provided with a flow passage 11 which terminates in an internally screwthreaded portion 12, the extremity of which is bevelled, as indicated by 13. The insect barrier includes a main nozzle 14, having a screwthreaded portion 15 which engages the screwthreads 12, and a bevelled flange 16 which sealingly engages the beveleld extremity 13.

The nozzle includes an extended portion 17, having a tapered bore 18, terminating in an orifice 19. Externally, the extended portion 17 is provided with longitudinally positioned radially extending ribs 20, which turn radially inward at the extremity of the nozzle forming a ring of guard bosses 21 surrounding the orifice 19, but spaced radially therefrom.

The nozzle 14 receives a barrier member 22, which includes a mandrel 23 provided with radiating webs 24. The webbed portion of the mandrel is disposed within the flow passage 11 inwardly from the screwthreaded portion 12. The mandrel 23 extends forwardly from the webs 24 and forms a tapered portion 25 which extends within the tapered bore 18 of the nozzle. The extremity of the mandrel 23 forms a blunt pointed end 26 which extends through and a slight distance beyond the orifice 19. The extended tip of the mandrel 23 is surrounded by the guard bosses 21.

The forward ends of the webs 24 extend a short distance within the bore of the nozzle 14, and each web is provided with a catch lug 27, which engages in an annular retention groove 28 formed in the bore 18 near the inward end of the nozzle.

It is preferred that the nozzle or at least the barrier member be formed of plastic material having slight elastomeric qualities so that the catch lugs 27 may be forced into the bore 18 until received in the groove 28 so that the nozzle member and the barrier member may be inserted or removed as a unit. It is also preferred that the nozzle member be formed of plastic material which forms a good sealing surface so that the nozzle member may be screwed by hand until the flange 16 engages the bevelled extremity 13 and forms a sealed connection therewith. Manual insertion and removal of the nozzle member 14 is facilitated by the radiating ribs 20.

When the nozzle member 14 and barrier member 22 are assembled, the pointed end of the mandrel projects slightly forward of the orifice 19 but is surrounded by the guard bosses 21.

The barrier is primarily intended for the type of wasp which form a nest of mud. These insects will form their nests in any cavity having an opening sufficiently large to admit the insect, usually in the order of $3/16$ of an inch in diameter or larger. The presence of the pointed tip of the mandrel in the orifice makes it impossible for the insect to enter the nozzle to deposit its eggs and fill the nozzle with mud. Furthermore, by reason of the fact that the mandrel tip projects slightly beyond the nozzle orifice, the insect quickly senses the presence of the obstruction and is discouraged from depositing eggs and subsequently attempting to seal the orifice.

While the insect barrier is shown in conjunction with one type of irrigation sprinkler, it should be understood that the barrier is adapted for use in conjunction with any type of irrigation sprinkler having a flow passage which receives a nozzle member.

The present embodiments of this invention are to be considered in all respects as illustrative and not restrictive.

I claim:

1. An insect barrier for irrigation sprinklers including means defining a flow passage having a discharge end, said barrier comprising:
   (a) a nozzle member including a screwthreaded end for connection to the discharge end of the flow passage, the nozzle member having a tapered bore terminating at its smaller end in an orifice, a ring of forwardly directed projections around the orifice clearing the water issuing from the orifice, and a barrier attachment element at the inner, larger end, of the bore;
   (b) a barrier member including a mandrel having a tapered forward end forming a point projecting through the orifice to engage an insect attempting to enter the orifice, integral longitudinally disposed mandrel centering ribs received in the flow passage inwardly of the nozzle member, and attachment elements at the forward ends of the ribs for connection to the nozzle member attachment element.

2. An insect barrier for irrigation sprinklers including means defining a flow passage having a discharge end, said barrier comprising:
   (a) a nozzle member adapted to be joined to the discharge end of the flow passage, having a bore terminating in an orifice at its outer end;
   (b) a longitudinally fixed barrier member including a tapered mandrel within said bore, having an apex end disposed at said orifice and radial webs integral with the mandrel extending axially within said flow passage inwardly from said nozzle member to center said mandrel, the mandrel extending free of said webs into the nozzle member;
   (c) and a connecting means removably securing the barrier member to the nozzle member including separable mutually engaging retention elements formed within the nozzle bore at the inner end thereof, and on said webs at the forward portions thereof.

References Cited

UNITED STATES PATENTS

| | | | |
|---|---|---|---|
| 1,998,592 | 4/1935 | Schenk | 239—230 X |
| 2,110,044 | 3/1938 | Jarvis | 239—288.5 X |
| 2,881,826 | 4/1959 | Spies | 239—600 X |
| 3,203,629 | 8/1965 | Goddard | 239—600 X |
| 3,204,873 | 9/1965 | Senninger | 239—230 |

FOREIGN PATENTS

| | | |
|---|---|---|
| 31,358 | 4/1961 | Finland. |

LLOYD L. KING, Primary Examiner

T. C. CULP, Jr., Assistant Examiner

U.S. Cl. X.R.

239—230